US008132397B2

(12) United States Patent
Shields

(10) Patent No.: US 8,132,397 B2
(45) Date of Patent: *Mar. 13, 2012

(54) ATTACHMENT FOR CONNECTION OF HARVESTING COMBINE AND BALER

(76) Inventor: Graham Michael Shields, Western Australia (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,719

(22) Filed: Sep. 9, 2011

(65) Prior Publication Data

US 2011/0314784 A1    Dec. 29, 2011

Related U.S. Application Data

(60) Continuation of application No. 11/962,670, filed on Dec. 21, 2007, now Pat. No. 8,033,088, which is a continuation-in-part of application No. 11/537,783, filed on Oct. 2, 2006, which is a division of application No. 10/871,842, filed on Jun. 18, 2004, now abandoned, which is a continuation of application No. PCT/AU02/01721, filed on Dec. 18, 2002.

(51) Int. Cl.
*A01D 75/00* (2006.01)
(52) U.S. Cl. .......................................... 56/341; 56/14.6
(58) Field of Classification Search .................. 56/14.6, 56/341; 100/88; 460/22, 23, 111, 114, 119
See application file for complete search history.

(56) References Cited

U.S. PATENT DOCUMENTS

| 865,161 A | 9/1907 | Coldwell |
|---|---|---|
| 1,248,382 A | 11/1917 | Neuman |
| 1,350,847 A | 8/1920 | Smith |
| 1,601,878 A | 10/1926 | Olson |
| 1,632,070 A | 6/1927 | Hawkins |
| 2,030,031 A | 2/1936 | Innes |
| 2,037,491 A | 4/1936 | Wagoner |
| 2,180,852 A | 11/1939 | Russell |
| 2,969,777 A | 12/1954 | Sutch |
| 3,138,185 A | 6/1964 | Joseph |
| 3,295,299 A | 1/1967 | Brady |
| 3,487,926 A | 1/1970 | Brister |
| 3,860,010 A | 1/1975 | Anderson |
| 3,952,889 A | 4/1976 | Wanker |
| 4,199,923 A | 4/1980 | Blake |
| 4,662,163 A | 5/1987 | Adams |
| 4,943,260 A | 7/1990 | Fossum |
| 5,661,961 A | 9/1997 | Westhoff |
| 5,839,954 A | 11/1998 | Schloesser |

(Continued)

FOREIGN PATENT DOCUMENTS

CA    1001423    12/1976

(Continued)

*Primary Examiner* — Alicia Torres
(74) *Attorney, Agent, or Firm* — Sturm & Fix LLP

(57) ABSTRACT

A conveyor provides a link between a combine harvester and a baler which is towed behind the combine harvester. The conveyor has a front inlet end positioned to receive trash flowing from the trash outlet of the combine harvester. The conveyor also has a rear outlet end positioned to deliver the trash to the inlet of the baler so that the trash can be baled without ever touching the ground.

1 Claim, 3 Drawing Sheets

U.S. PATENT DOCUMENTS

| | | | |
|---|---|---|---|
| 5,941,768 A | 8/1999 | Flamme | |
| 6,421,996 B1 | 7/2002 | Deutsch | |
| 6,591,743 B2 | 7/2003 | Deutsch | |
| 6,925,793 B2 | 8/2005 | Schlesser | |
| 7,721,516 B2 * | 5/2010 | Wendling | 56/10.2 A |
| 7,927,198 B2 * | 4/2011 | Redekop et al. | 460/99 |
| 8,033,088 B2 * | 10/2011 | Shields | 56/341 |
| 2011/0023441 A1 * | 2/2011 | Herron et al. | 56/341 |

FOREIGN PATENT DOCUMENTS

| | | | |
|---|---|---|---|
| DE | 969834 | | 7/1958 |
| DE | 3140262 | | 4/1983 |
| FR | 2288451 A | * | 6/1976 |
| FR | 2424862 | | 9/2006 |
| JP | 10313634 | | 12/1998 |

* cited by examiner

US 8,132,397 B2

ATTACHMENT FOR CONNECTION OF HARVESTING COMBINE AND BALER

CROSS-REFERENCE TO RELATED APPLICATIONS

This application is a Continuation of U.S. Ser. No. 11/962,670 filed Dec. 21, 2007, and entitled ATTACHMENT FOR CONNECTION OF HARVESTING COMBINE, which is a Continuation-In-Part application of U.S. Ser. No. 11/537,783 filed Oct. 2, 2006, and entitled BAILING APPARATUS; which is a Divisional application of U.S. Ser. No. 10/871,842, filed Jun. 18, 2004, entitled BALING APPARATUS, now abandoned; which is a Continuation of application PCT/AU02/01721, filed Dec. 18, 2002, claiming priority of Provisional application PR9605, filed Dec. 18, 2001. Applicant claims priority from all of the above mentioned applications, including the benefit under Title 35 United States Code §120 of all the above-identified applications, and incorporates them all herein by reference in their entireties.

BACKGROUND OF THE INVENTION

1. Field of the Invention

This invention relates to agricultural machinery and in particular machinery pertaining to the harvesting of a grain crop and the baling of the residue from the crop.

2. Description of Related Art

In harvesting a grain crop it has been conventional practice to remove the crop utilising a harvesting machine such as a header (which may be otherwise known as a combine harvester) which processes the cut crop to separate the grain from the harvested material and to deposit the unwanted straw, chaff and other waste material (hereinafter referred to as trash) at the rear of the machine. Such trash is deposited onto the ground generally in a row behind the combine harvester and subsequently the material is collected from the ground utilising a baling apparatus which forms the trash into bales which can be either used directly as stock feed or delivered to a mill for the production of processed stock feed. A disadvantage with such practice relates to the loss of the trash between it being deposited onto the ground and collected by a baling apparatus which can result in a loss on an average of 30% of the residue. The main reason for the inefficiency relates to the inefficiency of the baler in picking up the trash from the ground.

In addition, the trash generally includes a significant quantity of weed seeds some of which can be resistant to herbicide. Therefore to deposit the trash with the weed seeds onto the ground merely serves to compound a potential weed problem, especially given the pick-up inefficiency of the baling apparatus. Therefore it has also been common practice to deliver the trash from the combine harvester into a hopper which is trailed behind or beside the combine harvester whereby the trash is subsequently deposited at a site to be burnt or otherwise destroyed. The reason for taking this later course of action is to prevent the chemical resistant weed seeds from re-entering the environment. However this action is wasteful in that it destroys a significant amount of useful material which comprises a significant proportion of the trash and it is environmentally undesirable because of the smoke created by burning of the trash and the possible danger of a loss of control of the fire.

As an alternative to the collection of the trash and depositing it at a particular site it has also been common practice to deposit the trash onto the ground and then burn the resultant windrows and remaining stubble. Not only is such a practice wasteful of a valuable resource it also is poor farming practice in that it exposes the ground to erosion during the period between the harvesting of a crop and reseeding the ground

BRIEF SUMMARY OF THE INVENTION

Throughout this specification and claims, unless the context requires otherwise, the word "comprise" or variations such as "comprises" or "comprising", will be understood to imply the inclusion of a stated integer or group of integers but not the exclusion of any other integer or group of integers.

According to one aspect the invention resides in an apparatus comprising:

a combine harvester, the combine harvester having a front and a rear and being capable of separating grain from trash when moving in a forward direction over ground in which a crop is grown, the combine harvester being supported from a forward and rearward set of ground engaging wheels through a chassis, the combine harvester having a trash outlet proximate the rear;

a towable baling apparatus for converting trash into compacted bales, the baling apparatus having a front end and a rear end and an inlet adjacent the front end for receiving trash; and a conveyor having a forward end and a rearward end, a trash inlet adjacent the forward end and a trash outlet adjacent the rearward end;

the forward end of the conveyor being pivotally attached to the combine harvester proximate the rear such that the trash outlet of the combine is disposed above the trash inlet of the conveyor;

the rear end of the conveyor being pivotally attached to the baling apparatus such that the trash outlet of the conveyor is disposed adjacent the inlet of the baling apparatus, whereby the baler is towably connected to the combine harvester through the conveying apparatus and such that a large percentage of the trash from the combine harvester trash outlet enters the baling apparatus inlet through the conveying apparatus without ever touching the ground;

the forward end of the conveyor being pivotally supported from the rear of the combine harvester by a towbar which is fixed to the chassis proximate the support for the forward and rearward set of ground wheels.

According to a preferred feature of the invention the conveyor is driven through a hydraulic drive and wherein the hydraulic drive is driven from the combine harvester.

According to a preferred feature of the invention the baling apparatus is hydraulically driven and there is an interconnection between the combine harvester and the baling apparatus to enable the baling apparatus to be driven from the combine harvester.

According to a preferred feature of the invention when in an operative position, the conveyor is disposed generally parallel to the ground over which the conveyor is travelling.

According to a preferred feature of the invention in an operative position, no portion of the conveyor is disposed above the top of the baling apparatus.

According to a preferred feature of the invention the conveying means is configured so that the conveyor serves to prevent trash from falling to the ground during its passage from the trash outlet to the inlet of the baling apparatus.

According to a preferred feature of the invention the trash outlet of the conveyor is sufficiently close to the inlet of the baling apparatus that atmospheric winds will not blow significant amounts of trash to the ground.

According to a preferred feature of the invention the conveyor is provided with a moisturising means adapted to deliver a measured quantity of water onto the contents of the conveyor as the material passing to the baler, said moisturising means comprising a water reservoir, at least one spray head positioned to direct a spray of water onto the contents of the conveyor and a fluid line between the spray head and the water reservoir.

According to another aspect the invention resides in an apparatus comprising:

a combine harvester, the combine harvester having a front and a rear and being capable of separating grain from trash when moving in a forward direction over ground in which a crop is grown, the combine harvester being supported from a forward and rearward set of ground engaging wheels through a chassis, the combine harvester having a trash outlet proximate the rear;

a towable baling apparatus for converting trash into compacted bales, the baling apparatus having a front end and a rear end and an inlet adjacent the front end for receiving trash; and a conveyor having a forward end and a rearward end, a trash inlet adjacent the forward end and a trash outlet adjacent the rearward end;

the forward end of the conveyor being pivotally attached to the combine harvester proximate the rear such that the trash outlet of the combine is disposed above the trash inlet of the conveyor;

the rear end of the conveyor being pivotally attached to the baling apparatus such that the trash outlet of the conveyor is disposed adjacent the inlet of the baling apparatus, whereby the baler is towably connected to the combine harvester through the conveying apparatus and such that a large percentage of the trash from the combine harvester trash outlet enters the baling apparatus inlet without ever touching the ground;

wherein the conveyor is provided with a moisturising means adapted to deliver a measured quantity of water onto the contents of the conveyor as the material passing to the baler, said moisturising means comprising a water reservoir, at least one spray head positioned to direct a spray of water onto the contents of the conveyor and a fluid line between the spray head connected to the water reservoir through a fluid line.

According to another aspect the invention resides in an attachment adapted to provide a towing link between a combine harvester and a baling apparatus, the baling apparatus having an inlet disposed at the forward end of the baling apparatus, said combine harvester also having a trash outlet proximate it's rear for the delivery of trash from the combine harvester, wherein the trash results from the separation of grain from crop collected by the combine harvester, the attachment adapted at its forward end to be pivotally supported from the rear of the combine harvester and adapted at its rearward end to be pivotally connected to the forward end of the baling apparatus, said attachment further comprising a conveying means supported to extend from the forward end to the rearward end of the attachment, the forward end of the conveying means having a trash inlet positioned to receive trash flowing from the trash outlet of the combine harvester, the rear end of the conveying means having an outlet positioned to deliver trash to the inlet of the baling apparatus, the conveying means including a conveyor extending between the forward end and the rear end and adapted to convey the trash from the trash inlet to the outlet, the conveyor is provided with a moisturising means adapted to deliver a measured quantity of water onto the contents of the conveyor as the trash passes to the baler, said moisturising means comprising a water reservoir, at least one spray head positioned to direct a spray of water onto the contents of the conveyor and a fluid line between the , the spray head and the water reservoir.

According to a preferred feature of each aspect of the invention the water reservoir is supported from the conveying means. According to an alternative preferred feature of each aspect of the invention the water reservoir is intended in use to be supported from the baling apparatus. According to an alternative preferred feature of each aspect of the invention the water reservoir is intended in use to be supported from the combine harvester.

According to a preferred feature of the invention the conveying means comprises an attachment which can be removably mounted to the baling apparatus.

According to a preferred feature of the invention the pivotal connection, the trash outlet and the trash inlet are located in a generally vertical alignment.

According to a preferred feature of the invention the conveyor is driven through a hydraulic drive wherein hydraulic drive is driven from the combine harvester.

According to a preferred feature of the invention, the baling apparatus is hydraulically driven and the attachment provides an interconnection between the combine harvester and the baling apparatus to enable the baling apparatus to be driven from the combine harvester.

The invention will be more fully understood in the light of the following description of several specific embodiments.

BRIEF DESCRIPTION OF THE SEVERAL VIEWS OF THE DRAWINGS

The description is made with reference to the accompanying drawings of which.

DETAILED DESCRIPTION OF THE INVENTION

Figure 1:
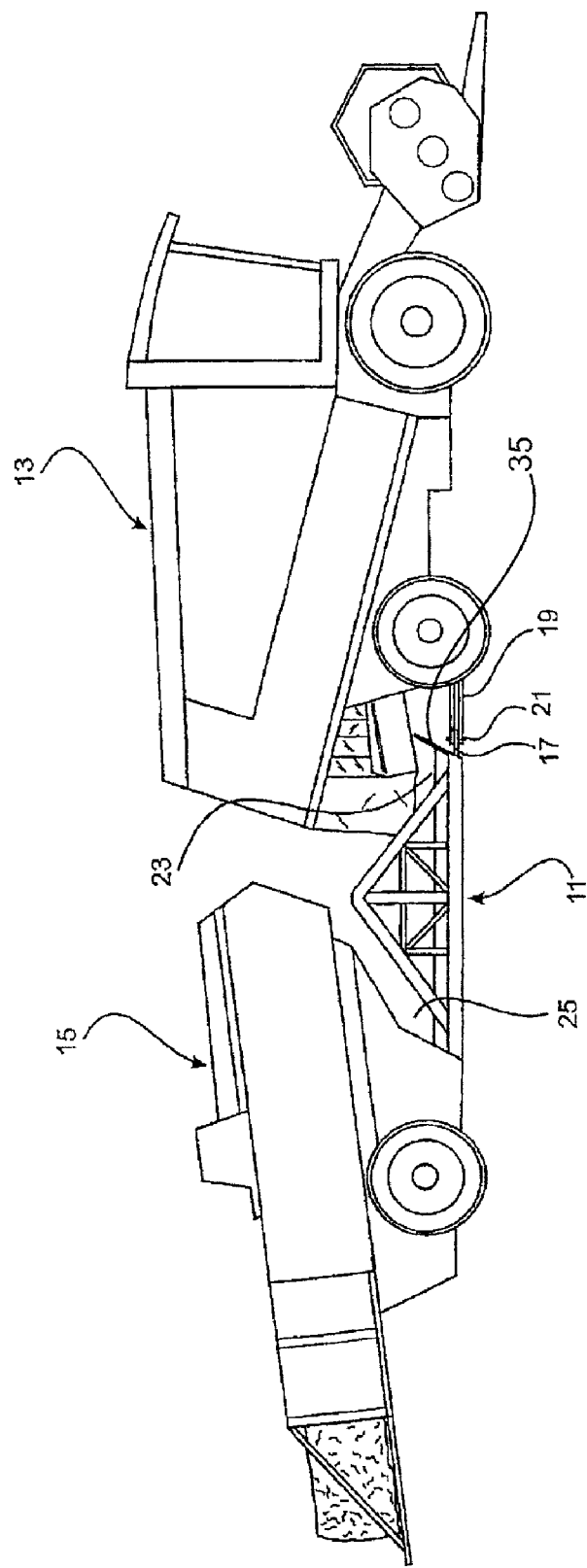
FIG. 1 is a schematic side elevation of a conveying means according to the first embodiment provided between a combine harvester and baler.

The first and second embodiment each comprises a conveying means which is intended to provide a link between a combine harvester 13 and a baler 15 and which can comprise an attachment which is supported from the baling apparatus. In accordance with the embodiment, the baler 15 is provided with an extended draw bar 17 which has a greater forward extent than a conventional draw bar of a baler 15. The draw bar 17 of the baler is supported from a towbar assembly 19 which is mounted to the combine harvester chassis to extend rearwardly from the combine harvester. The draw bar 17 and towbar 19 are pivotally interconnected by a pin 21 or like pivot.

The draw bar supports the conveying means 11 which comprises an inlet 23 provided at the forward most end of the draw bar 17 and an outlet 25 which is to be located at the inlet of the baler 15. A belt conveyer comprising an endless belt 27 is received over a pair of end rollers 29 and 31 which are located at the outlet and inlet end of the conveying means 11, respectively. The belt conveyer is driven by a hydraulic motor in order to convey any material which is deposited onto it at the inlet 23 to the outlet 25. The inlet 23 of the conveying means is located such that it generally underlies the outlet of the combine harvester 13. The forward end of the conveying means is provided with a an inclined forward wall 35 and a pair of side walls to each side of the conveyor which are positioned in order to prevent any spillage of trash from the conveying means in its passage from the trash outlet 33 of the combine harvester onto the ground. As a result the positioning of the conveying means underneath the outlet, substantially all of the trash being delivered from the combine harvester 13 is deposited onto the inlet 23 of the conveying means.

The outlet of the conveying means is positioned at the entry to the inlet of the baler 15 such that the trash being deposited onto the conveying means and conveyed by the belt 27 to the outlet 25 will be passed to the inlet of the baler to be baled. The forward end of the inlet 23 is located in generally vertical alignment with the pin 21 such that as the draw bar 17 of the baler 15 pivots on the pin 21, with movement of the combine harvester 13, the inlet rotates about the pivot axis of the pin 21 to pivot within the confines of the structure at the rear of the combine harvester.

The conveyor is hydraulically driven and the hydraulic drive which is utilised to drive the conveyer belt 27 over the rollers 29 and 31 is derived from the hydraulic power supply of the combine harvester. Similarly, the baler is hydraulically driven and the hydraulic drive for the baler 15 is derived from the hydraulic drive accommodated within the combine harvester 13. As a result, the conventional hydraulic drive of the combine harvester may need to be upgraded and/or modified in order to accommodate for the increased demand required by the conveying means 11 and the baler 15.

The trash outlet of the combine harvester 13 is modified such that the conventional outlet chute is removed and is replaced by an outlet tray which will deposit the trash onto the inlet 23 of the conveying means.

Figure 3:
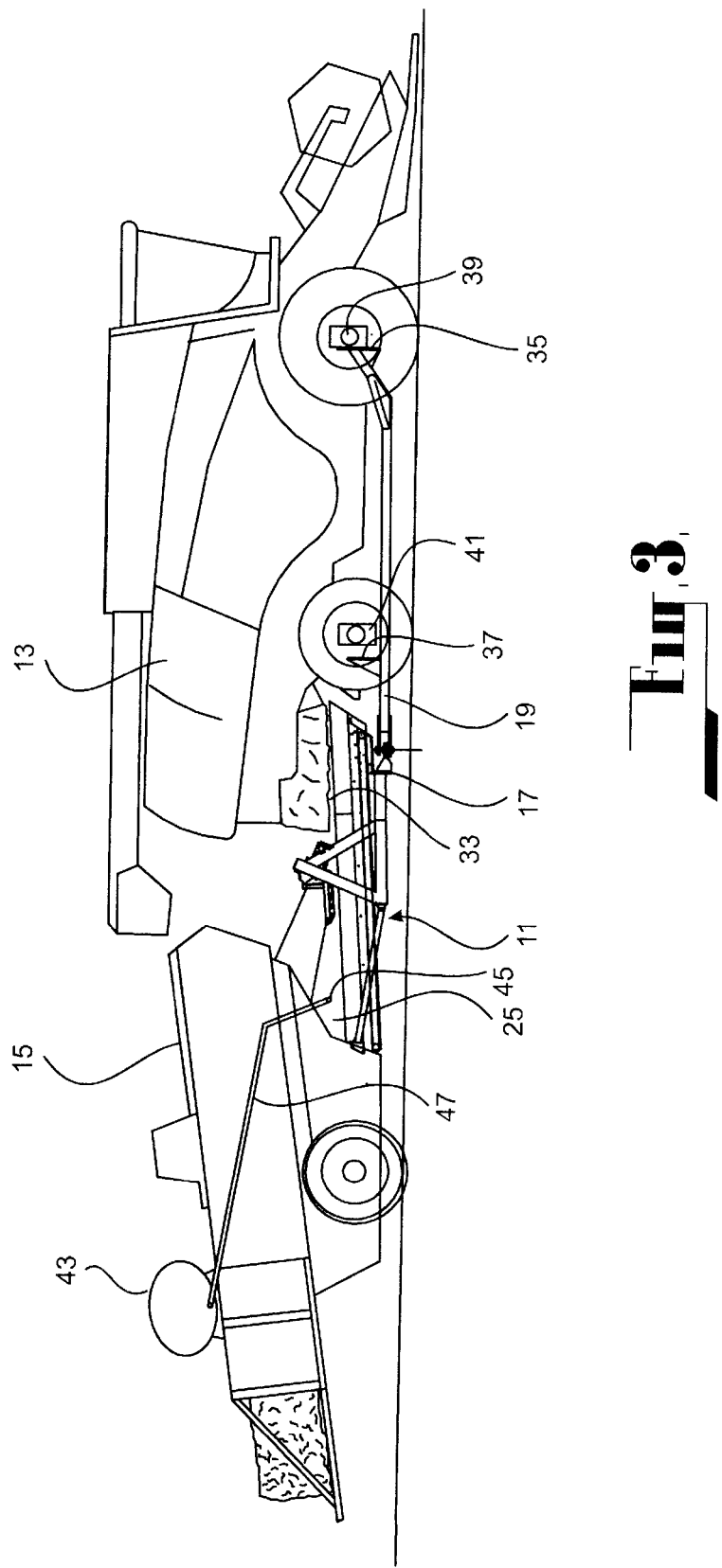
FIG. 3 is a schematic side elevation of a combine harvester and baler interconnected by the conveying means according to the second embodiment illustrating the support provided for the towbar of the combine harvester.

As shown at FIG. 3, the towbar 17 extends forwardly from its rear most position such that it is supported from the chassis of the combine harvester from brackets 35 and 37, which are in turn supported from portion of the chassis supporting the front and rear axles 39 and 41, respectively, of the combine harvester 13. This arrangement ensures that the loading exerted ion the chassis by the baler 15 is distributed through the chassis.

Figure 2:
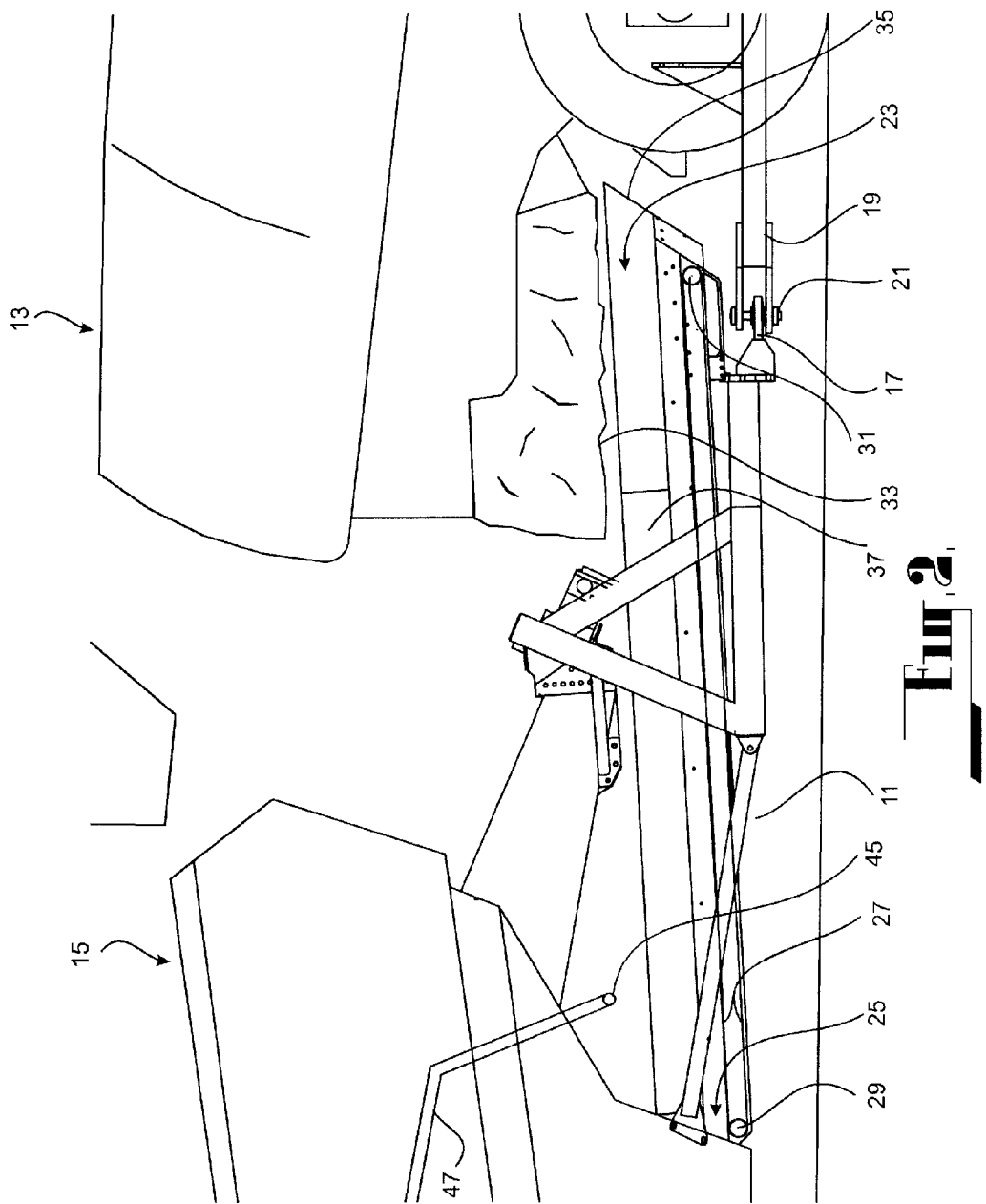
FIG. 2 is an enlarged sectional elevation of the conveying means of the first and second embodiment in position between the combine harvester and baler which are not shown in section.

In addition, it is a characteristic of trash and straw that when it is dry it becomes more difficult to compact. As a result, the amount of trash and straw which can be incorporated into a bale is dependent upon the moisture content of the trash. In this regard, it is conventional wisdom that the trash needs to be dry before it can be baled. In this regard, the second embodiment of the invention as shown at FIGS. 2 and 3 incorporates a moisturising means which is able to deliver a controlled amount of moisture to the trash during its passage between the combine harvester and the baler. The amount of moisture is sufficient to reduce the resilience of the trash to enable it to be more readily compacted within the baler. The moisturising means comprises a water tank 43 which is mounted to the baler and a spray head 45 which is able to deliver a fine spray of water onto the material travelling on the conveyor before it enters the conveyor outlet 25. The spray head 45 is able to produce a spray which has a transverse extent which is substantially equal to the width of the conveyor. The spray head is connected to the tank 43 through a supply line 47 and a pump (not shown) is provided to deliver a regulated water supply to the spray head 45. The result of the moisturising means is a bale containing more material than is usually the case with a dry trash.

The first and second embodiments each provide the advantage that substantially all of the trash produced by the processing of the harvested crop is delivered to the baler 15. As a result, the inefficiencies resulting from the previous practice of initially depositing the trash onto the ground and then subsequently collecting the residual material from the ground are overcome. In addition, in the event that trash incorporates weed seeds which may be chemically resistant, substantially all of that material is incorporated into the bales which may then be delivered to a stock food processor for the production of processed stock food, which process may result in destruction of the viability of the weed seeds. The support provided for the baler by the chassis is such that the towing load is borne by both axle supports and thus the load is substantially evenly distributed. In addition, the presence of the moisturising means enables the baler to load more trash into each bale. A further advantage of the first and second embodiments relates to the energy savings in that their use avoids the requirement to pick up the discarded trash from the ground at the conclusion of the harvesting of a crop.

An alternative use of the baled trash is the production of a bio-fuel such as ethanol.

According to an alternative embodiment of the invention, the water tank of the first embodiment is adapted to be supported from the combine harvester.

According to an alternative embodiment of the invention, the water tank of the first embodiment is supported from the conveying means.

According to an alternative embodiment of the invention, the conveyor is driven from a mechanical drive associated with the combine harvester.

According to an alternative embodiment of the invention, the conveyor is driven from a mechanical drive associated with the baling apparatus.

The present invention is not to be limited in scope by the specific embodiments described herein. The embodiments are intended for the purpose of exemplification only. Functionally equivalent products and methods are clearly within the scope of the invention as described herein.

The invention claimed is:

1. An apparatus comprising:
a combine harvester, the combine harvester having a front and a rear and being capable of separating grain from trash when moving in a forward direction over ground in which a crop is grown, the combine harvester being supported from a forward and rearward set of ground engaging wheels through a chassis, the chassis having a front and a rear part thereof, the combine harvester having a trash outlet proximate the rear, said trash comprising plant stalk material;
a towbar being operatively attached to the combine;
a towable baling apparatus for converting trash into compacted bales, the baling apparatus having a front end and a rear end, ground engaging wheels and an inlet adjacent the front end for receiving trash;
a conveyor having a forward end and a rearward end, a trash inlet adjacent the forward end and a trash outlet adjacent the rearward end, the trash outlet of the conveyor being adjacent to and above the baling apparatus inlet, the conveyor also having a frame with a front and a back;
the forward end of the conveyor frame being operatively pivotally attached along a substantially vertical axis to the rear of the towbar proximate the rear of the combine harvester, the substantially vertical axis extending through the conveyor trash inlet and through the conveyor such that the trash outlet of the combine is always disposed above the trash inlet of the conveyor; and the conveyor frame being operatively attached to the baling apparatus at a place above the conveyor between the forward end and a rearward end of the conveyor whereby the baler is towably connected to the combine harvester through the conveyor and such that a large percentage of the trash from the combine harvester trash outlet enters the baling apparatus inlet through the conveying apparatus without ever touching the ground.

* * * * *